(No Model.)

P. THOMAS & L. S. BEALS.
CHAIN.

No. 429,978. Patented June 10, 1890.

WITNESSES:
William M. Miller
Edward Wolff

INVENTORS
Philip Thomas
Leonard S. Beals,
BY
Van Santvoord & Hauff
ATTORNEYS

UNITED STATES PATENT OFFICE.

PHILIP THOMAS AND LEONARD S. BEALS, OF LONG ISLAND CITY, NEW YORK.

CHAIN.

SPECIFICATION forming part of Letters Patent No. 429,978, dated June 10, 1890.

Application filed November 7, 1889. Serial No. 329,476. (No model.)

*To all whom it may concern:*

Be it known that we, PHILIP THOMAS and LEONARD S. BEALS, both citizens of the United States, residing at Long Island City, (Astoria,) in the county of Queens and State of New York, have invented new and useful Improvements in Chains or Bracelets, of which the following is a specification.

This invention relates to an improvement in chains or bracelets; and the invention consists in the details of construction set forth in the following specification and claims, and illustrated in the accompanying drawings, in which—

Figure 1:
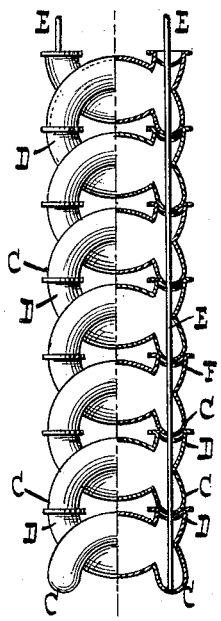
Figure 2:
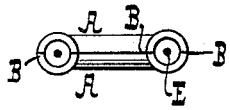

Figure 1 is a sectional plan view of a portion of the improved chain. Fig. 2 is an end view of the same, and Fig. 3 is a sectional view of a modification.

The links are shown consisting of corresponding sections or halves A A, connected or soldered to one another along the seams B B. The halves or sections A A can be readily formed from sheet metal, so as to be light and cheap, and said sheet-metal sections can have their faces stamped or embossed, so as to represent any pleasing designs, and the sections can be readily cut by dies of varying shapes or configurations, so as to secure variety in the shapes of the sections. The sections are somewhat bulged or hollowed, so as to leave a chamber or space between said sections, and the ends C D of the links are perforated or opened, so as to allow of the insertion of wires or flexible connections E for holding the links together.

In Fig. 1 the links are shown as having the ends C rounded, while the ends D are provided with a flat or wide opening to receive the rounded ends C. The rounded ends C, passing a certain distance into the openings of the ends D, will form a closed pivotal joint, which, while allowing play to the links, will not leave any opening or space visible between the links. To prevent the link-sections being pressed apart by the link ends C passing into the abutting link ends D, the links may be strengthened at the ends D by a brace or cup-shaped disk F, which is soldered or secured within the link and which serves to hold the sections A A together. The disk or cup F is perforated for the passage of the connections E.

Figure 3:
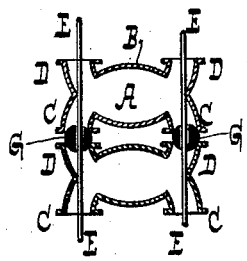

In place of having the ends C rounded to form the pivotal joints, said ends C can be made with flat openings, Fig. 3, to correspond to the ends D, in which case the pivotal joints can be made by inserting balls G between the abutting ends C D and allowing said balls to rest partly within the openings of the ends C D. Said balls thus form close joints between the links, while allowing said links play with respect to one another. The balls G are perforated for the passage of the connections E.

The chain can be used wherever found suitable—as, for example, in jewelery in making bracelets, necklaces, and other articles.

What we claim as new, and desire to secure by Letters Patent, is—

1. A chain composed of a series of links pivotally engaged with each other at their adjoining ends and each link having perforations at the pivotal joints, and a pair of approximately parallel flexible connections extending through the perforations at the pivotal joints, substantially as described.

2. A chain having links composed of corresponding halves or sections, each link being provided with a recess or opening for the insertion of the abutting portion of the adjoining link, and a flexible connection uniting said links, substantially as described.

3. A chain having links composed of corresponding halves or sections, each link being provided with a recess or opening for the insertion of the abutting portion of the adjoining link, a brace or cup F, for strengthening the link at such recess or opening, and a flexible connection uniting said links, substantially as described.

4. A chain having links composed of corresponding halves or sections, said links having their ends provided with pivotal joints, and a flexible connection uniting the links, substantially as described.

5. A chain-link composed of corresponding halves or sections and a cup or brace F, for uniting said halves or sections, substantially as described.

In testimony whereof we have hereunto set our hands in the presence of two subscribing witnesses.

PHILIP THOMAS.
LEONARD S. BEALS.

Witnesses:
WILLIAM C. HAUFF,
E. F. KASTENHUBER.